United States Patent
Benco et al.

(10) Patent No.: US 7,526,270 B2
(45) Date of Patent: Apr. 28, 2009

(54) SELECTING ONE OF A PLURALITY OF SERVICE PROVIDERS TO HANDLE A COMMUNICATION SESSION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 190 days.

(21) Appl. No.: 10/836,290

(22) Filed: Apr. 30, 2004

(65) Prior Publication Data

US 2005/0245230 A1    Nov. 3, 2005

(51) Int. Cl.
*H04M 11/00* (2006.01)
(52) U.S. Cl. .............. 455/406; 455/405; 455/407; 455/408; 455/409; 705/1; 705/26; 705/37
(58) Field of Classification Search ......... 455/405–409, 455/456.1, 456.2, 456.3, 456.4, 456.5, 456.6; 705/1, 26, 37
See application file for complete search history.

(56) References Cited

U.S. PATENT DOCUMENTS

| | | | | |
|---|---|---|---|---|
| 5,794,140 A * | 8/1998 | Sawyer | ...................... | 455/408 |
| 5,802,502 A * | 9/1998 | Gell et al. | ...................... | 705/37 |
| 5,903,832 A * | 5/1999 | Seppanen et al. | ........ | 455/435.3 |
| 5,915,214 A * | 6/1999 | Reece et al. | ................. | 455/406 |
| 5,970,403 A * | 10/1999 | Alperovich et al. | ......... | 455/406 |
| 6,018,652 A * | 1/2000 | Frager et al. | ................. | 455/406 |
| 6,101,379 A * | 8/2000 | Rahman et al. | ............. | 455/406 |
| 6,167,250 A * | 12/2000 | Rahman et al. | ............. | 455/406 |
| 6,324,394 B1 * | 11/2001 | Vazvan | ....................... | 455/406 |
| 6,400,946 B1 * | 6/2002 | Vazvan et al. | ............. | 455/432.1 |
| 6,516,192 B1 * | 2/2003 | Spaur et al. | .................. | 455/450 |
| 6,564,047 B1 * | 5/2003 | Steele et al. | ................ | 455/405 |
| 6,577,717 B1 * | 6/2003 | Henon | .................... | 379/114.01 |
| 6,934,527 B1 * | 8/2005 | Hamada | ..................... | 455/405 |
| 6,954,630 B2 * | 10/2005 | Offer | .......................... | 455/406 |
| 2002/0177431 A1 * | 11/2002 | Hamilton et al. | ............ | 455/406 |
| 2002/0193107 A1 * | 12/2002 | Nascimento, Jr. | ........... | 455/426 |
| 2003/0003933 A1 * | 1/2003 | Deshpande et al. | ......... | 455/510 |
| 2003/0045269 A1 * | 3/2003 | Himmel et al. | ............. | 455/408 |

\* cited by examiner

*Primary Examiner*—Charles N Appiah
*Assistant Examiner*—Olumide T Ajibade Akonai

(57) ABSTRACT

A mobile communication device of an apparatus in one example sends a plurality of rate queries to a plurality of service providers. Based on one or more rate quotes received from one or more of the plurality of service providers in response to one or more of the plurality of rate queries, the mobile communication device selects one of the plurality of service providers to handle a communication session.

24 Claims, 2 Drawing Sheets

SELECTING ONE OF A PLURALITY OF SERVICE PROVIDERS TO HANDLE A COMMUNICATION SESSION

TECHNICAL FIELD

The invention relates generally to communications and more particularly to setup of mobile communication sessions.

BACKGROUND

In known communication systems, a user of a mobile communication device subscribes to a specific service provider to receive wireless telecommunication service. Upon an attempt by the user to initiate a communication session, the mobile communication device employs resources of the service provider to connect the communication session. For example, the mobile communication device sends the data of the communication session over an air interface to a base station associated with the service provider. The base station passes the data of the communication session to a mobile switching center. The mobile switching center directs the data through a public switched telephone network ("PSTN") to an intended destination of the communication session. The service provider also delivers incoming communication sessions to the mobile communication device.

In one example, the user of the mobile communication device and the service provider operate under a contract that allots a fixed number of usage minutes per month to the mobile communication device for a monthly fee. The contract may also assign a fixed price for each additional usage minute in excess of the fixed number of usage minutes per month. In another example, the user of the mobile communication device prepays for usage minutes from the service provider. The user of the mobile communication device funds subsequent telecommunication service with the prepaid usage minutes.

The user of the mobile communication device is required to employ the same service provider for each communication session. Other service providers may have lower rates at various times. As one shortcoming, the user of the mobile communication device is unable to employ the other service providers to reduce the cost incurred during a communication session. The other service providers may have excess capacity at various times. As another shortcoming, the other service providers are unable to receive revenue by utilizing the excess capacity to handle the communication session for the mobile communication device.

Thus, a need exists for a communication system that promotes a reduction in cost to a user of a mobile communication device. A further need exists for a communication system that promotes use of excess service provider capacity.

SUMMARY

In one embodiment, there is provided an apparatus comprising a mobile communication device that sends a plurality of rate queries to a plurality of service providers. Based on one or more rate quotes received from one or more of the plurality of service providers in response to one or more of the plurality of rate queries, the mobile communication device selects one of the plurality of service providers to handle a communication session.

In another embodiment, there is provided a method for: sending a plurality of rate queries to a plurality of wireless service providers to trigger one or more rate quotes from one or more of the plurality of wireless service providers; and connecting the call through one of the plurality of wireless service providers based on the one or more rate quotes.

In yet another embodiment, there is provided a method for: requesting a first rate quote from a first wireless service provider and a second rate quote from a second wireless service provider for a communication session upon attempt by a user to initiate the communication session; comparing the first rate quote with the second rate quote to determine a lower one of the first and second rate quotes; identifying one of the first and second wireless service providers that is associated with the lower one of the first and second rate quotes; and employing the one of the first and second wireless service providers that is associated with the lower one of the first and second rate quotes is employed for connection of the communication session.

DESCRIPTION OF THE DRAWINGS

Features of exemplary implementations of the invention will become apparent from the description, the claims, and the accompanying drawings in which:

DETAILED DESCRIPTION

Figure 1:
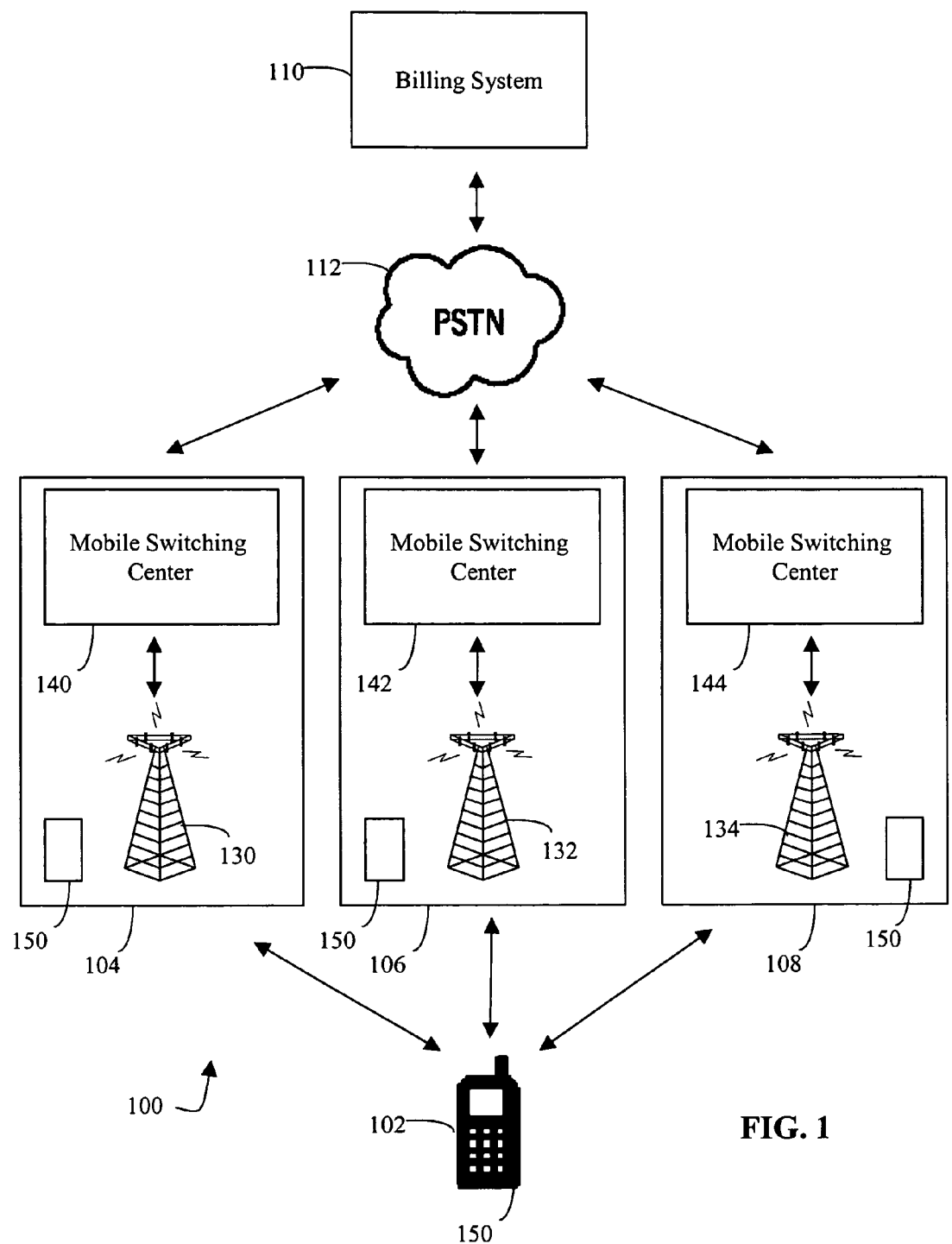
FIG. 1 is a representation of an exemplary implementation of an apparatus that comprises one or more mobile communication devices, a plurality of service providers, and one or more billing system components.

Turning to FIG. 1, an apparatus 100 in one example comprises one or more mobile communication devices 102, a plurality of service providers 104, 106 and 108, and one or more billing system components 110. A public switched telephone network ("PSTN") 112 in one example communicatively couples the service providers 104, 106 and 108 with the billing system component 110.

The mobile communication device 102 is able to communicate with each of the service providers 104, 106 and 108. The mobile communication device 102 communicates with each of the service providers 104, 106 and 108 to determine which one of the service providers 104, 106 and 108 to use for connection of a communication session. Before connection of the communication session, the mobile communication device 102 may send rate queries to the service providers 104, 106 and 108 to trigger one or more rate quotes from the service providers 104, 106 and 108 for the communication session. For example, the mobile communication device 102 may send a first rate query to the service provider 104, a second rate query to the service provider 106, and a third rate query to the service provider 108.

The mobile communication device 102 selects one of the service providers 104, 106 and 108 to handle the communication session based on the one or more rate quotes received from one or more of the service providers 104, 106 and 108. For example, the mobile communication device 102 analyzes the rate quotes to identify one of the rate quotes that the mobile communication device 102 determines is best. The mobile communication device 102 will then select the one of the service providers 104, 106 and 108 that offered the best one of the rate quotes.

The mobile communication device 102 comprises a plurality of service provider protocols and software to interface with the plurality of service providers 104, 106 and 108. The mobile communication device 102 is able to recognize a plurality of air interface technologies and/or a plurality of different frequency bands. The mobile communication device 102 in one example comprises a multi-mode mobile communication device that can support communication sessions within a plurality of different frequency bands and/or a plurality of different air interface technologies.

In one embodiment, the service providers 104, 106 and 108 may operate in different frequency bands and the mobile communication device 102 is able to tune transmission and receiving capabilities to any of the different frequency bands for communication with any of the service providers 104, 106 and 108. In another example, the service providers 104, 106 and 108 may employ different air interface technologies and the mobile communication device 102 is able to tune transmission and receiving capabilities to any of the different air interface technologies for communication with any of the service providers 104, 106 and 108.

The service providers 104, 106 and 108 provide wireless service to the mobile communication device. The service providers 104, 106 and 108 send competing bids to the mobile communication device 102 to handle communication sessions for the mobile communication device 102. Upon receipt of a rate query, the service providers 104, 106 and 108 know that the mobile communication device 102 associated with the rate query is requesting an offer to handle the communication session. Upon receipt of the rate query from the mobile communication device 102, the service providers 104, 106 and 108 send rate quotes to the mobile communication device 102. The rate quotes comprise an offer to handle a specific communication session at a specific rate. The service providers 104, 106 and 108 in one example have excess capacity and are willing to sell the excess capacity at a discounted rate. Therefore, the mobile communication device 102 receives a lower rate for a communication session and the service providers 104, 106 and 108 are able to utilize the excess capacity.

The service providers 104, 106 and 108 comprise base stations 130, 132 and 134 and mobile switching centers ("MSCs") 140, 142 and 144. The base stations 130, 132 and 134 support air interface connections with the mobile communication device 102. The base stations 130, 132 and 134 connect the communication device 102 with the mobile switching centers 140, 142 and 144. The mobile switching centers 140, 142 and 144 in one example route the communication sessions through the public switched telephone network 112 to another communication device at an intended destination of the communication session. The mobile switching centers 140, 142 and 144 also may send billing reports through the public switched telephone network 112 to the billing system component 110.

The billing system component 110 maintains billing records that track the usage of the service providers 104, 106 and 108 by the mobile communication device 102. The billing records in one example comprise Automatic Message Accounting ("AMA") billing records. The billing system component 110 compiles billing reports from one or more of the service providers 104, 106 and 108 for one or more communication sessions billable to the mobile communication device 102. The billing system component 110 in one example sends a monthly bill to the user of the mobile communication device 102. The monthly bill combines the billing records from any of the service providers 104, 106 and 108 employed by the mobile communication device 102 during a given month. The billing system component 110 in one example is associated with a wireless service reseller organization that supplies wireless service to the mobile communication device 102 through any one of the service providers 104, 106 and 108.

Figure 2:
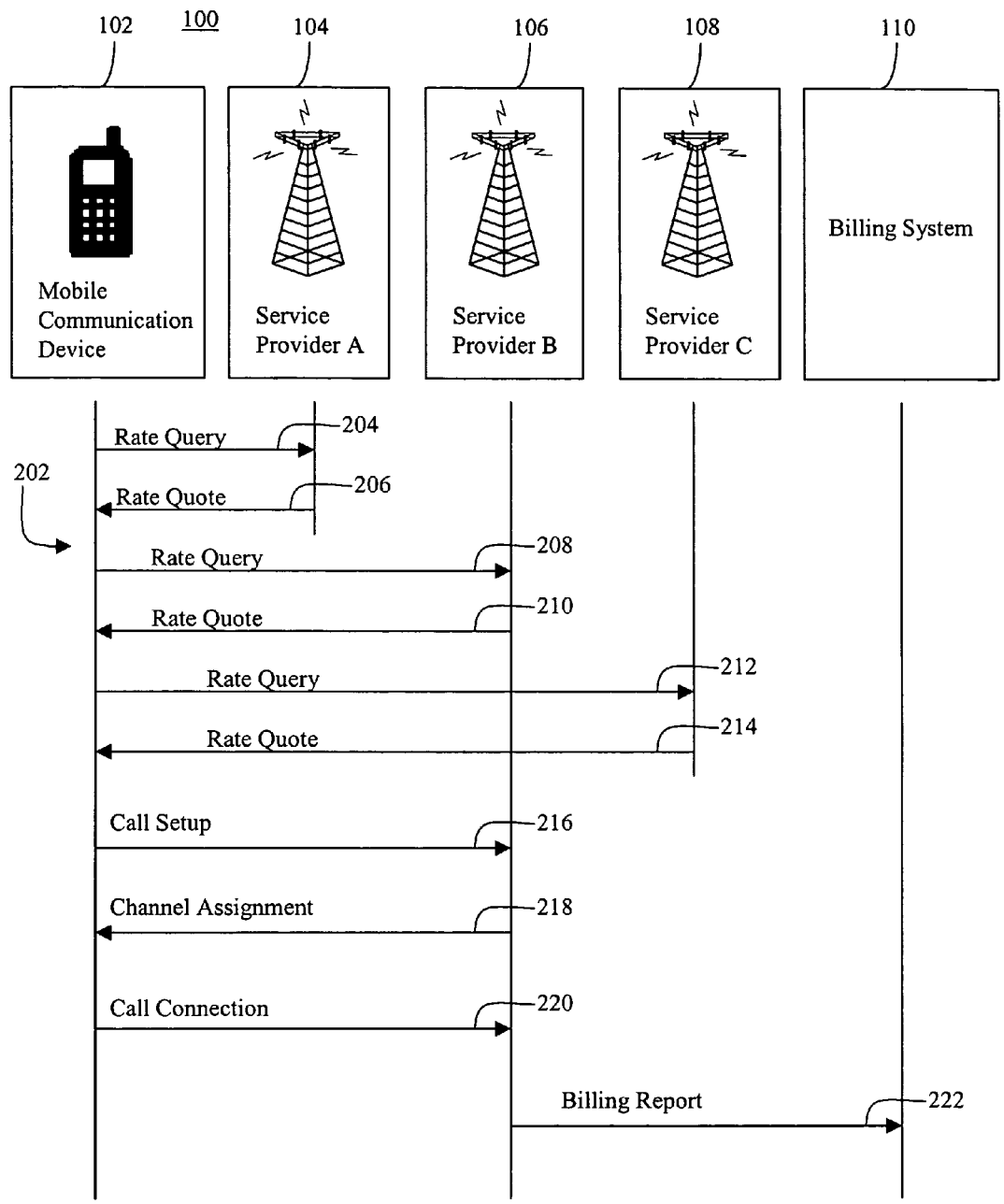
FIG. 2 is a representation of an exemplary message flow for connection of a communication session through one of the plurality of service providers of the apparatus of FIG. 1.

Referring to FIG. 2, an illustrative description of one exemplary operation of the apparatus 100 is now presented, for explanatory purposes. A message flow 202 represents an exemplary connection of a communication session through one of the plurality of service providers 104, 106 and 108.

Upon attempt by a user of the mobile communication device 102 to initiate the communication session, the mobile communication device 102 sends a plurality of rate queries to the service providers 104, 106 and 108 to determine which one of the service providers 104, 106 and 108 to use for connection of the communication session. For example, the mobile communication device 102 attempts to make a call to another communication device. Before connection of the call to the other communication device, the mobile communication device 102 sends the rate queries to the service providers 104, 106 and 108 to trigger one or more rate quotes from the service providers 104, 106 and 108 in response to the rate queries. The rate quotes indicate the price the service providers 104, 106 and 108 are willing to accept for handling the call. The mobile communication device 102 in one example chooses one of the service providers 104, 106 and 108 to handle the call based on the rate quotes received from the service providers 104, 106 and 108.

To determine an available rate for the communication session from the service provider 104, the mobile communication device 102 sends a rate query 204 to the service provider 104. The rate query 204 in one example carries connection information of the communication session to the service provider 104. For example, the rate query 204 may indicate one or more of the location of the communication device endpoints of the communication session, type of communication session, and/or the like.

Upon receipt of the rate query 204, the service provider 104 employs the connection information of the communication session received in the rate query 204 and internal information to determine a rate for the communication session. To determine the rate for the communication session, the service provider 104 may consider one or more of the time of day, current load, availability of excess capacity, location of the endpoints of the communication session, and/or the like. The service provider 104 in one example employs a predetermined algorithm that factors in one or more characteristics of the communication session and/or communication network of the service provider 104 to determine the rate. Upon determination of the rate, the service provider 104 sends a rate quote 206 to the mobile communication device 102. The rate quote 206 indicates the rate to the mobile communication device 102.

To determine an available rate for the communication session from the service provider 106, the mobile communication device 102 sends a rate query 208 to the service provider 106. The service provider 106 responds to the mobile communication device 102 with a rate quote 210 to indicate the rate for the communication session offered by the service provider 106. To determine an available rate for the communication session from the service provider 108, the mobile communication device 102 sends a rate query 212 to the service provider 108. The service provider 108 responds to the mobile communication device 102 with a rate quote 214 to indicate the rate for the communication session offered by the service provider 108. The mobile communication device 102 and the service providers 106 and 108 exchange and process the rate queries 208 and 212 and the rate quotes 210 and 214 analogously to the rate query 204 and the rate quote 206, as described herein.

The mobile communication device 102 is able to communicate with each of the service providers 104, 106 and 108.

For example, the mobile communication device 102 comprises a plurality of protocols and software to interface with each of the service providers 104, 106 and 108. The mobile communication device 102 in one example comprises a multi-mode mobile communication device that can support communication sessions within a plurality of different frequency bands and/or a plurality of different air interface technologies.

The service providers 104, 106 and 108 in one example each operate within a different frequency band. The service provider 104 in one example operates within a first frequency band, the service provider 106 operates within a second frequency band, and the service provider 108 operates within a third frequency band. To communicate with the service provider 104, the mobile communication device 102 sets the first frequency band for active operation. For example, the mobile communication device 102 employs the first frequency band to send the rate query 204 to the service provider 104. To communicate with the service provider 106, the mobile communication device 102 switches from active operation of the first frequency band to active operation of the second frequency band. For example, the mobile communication device 102 employs the second frequency band to send the rate query 208 to the service provider 106. To communicate with the service provider 108, the mobile communication device 102 switches from active operation of the second frequency band to active operation of the third frequency band. For example, the mobile communication device 102 employs the third frequency band to send the rate query 212 to the service provider 108.

In one example, the mobile communication device 102 sends one of the rate queries 204, 208 and 212 and receives one of the rate quotes 206, 210 and 214 on the same frequency band before switching to active operation of another frequency band. In another example, the mobile communication device 102 switches between the frequency bands to send each of the rate queries 204, 208 and 212, and then again switches between the frequency bands to receive each of the rate quotes 206, 210 and 214. For example, the mobile communication device 102 sets the first frequency band for active operation to receive the rate quote 206 from the service provider 104. The mobile communication device 102 switches from active operation of the first frequency band to active operation of the second frequency band to receive the rate quote 210 from the service provider 106. The mobile communication device 102 switches from active operation of the second frequency band to active operation of the third frequency band to receive the rate quote 214 from the service provider 108. If the service providers 104, 106 and 108 employ different air interface technologies, then the mobile communication device 102 may also switch between air interface technologies to communicate with the service providers 104, 106 and 108 analogously to the switching between frequency bands, as described herein.

After receipt of the rate quotes 206, 210 and 214, the mobile communication device 102 selects one of the service providers 104, 106 and 108 to handle the communication session. For example, the mobile communication device 102 analyzes the rate quotes 206, 210 and 214 to select one of the service providers 104, 106 and 108 for connection of the communication session.

In one example, the mobile communication device 102 selects the one of the service providers 104, 106 and 108 that offers the lowest per minute rate for the communication session. For example, if the rate quote 206 comprises a lowest per minute rate of the rate quotes 206, 210 and 214, then the mobile communication device 102 selects the service provider 104 for connection of the communication session. If the rate quote 210 comprises a lowest per minute rate of the rate quotes 206, 210 and 214, then the mobile communication device 102 selects the service provider 106 for connection of the communication session. If the rate quote 214 comprises a lowest per minute rate of the rate quotes 206, 210 and 214, then the mobile communication device 102 selects the service provider 108 for connection of the communication session.

In another example, a user of the mobile communication device 102 pre-sets one of the service providers 104, 106 and 108 as a preferred service provider. For example, the user may consider the service provider 104 as a higher quality service provider. So, the user is willing to pay a premium for the service provider 104 to handle the communication session. If the rate quote 206 is less than or equal to the rate quotes 210 and 214, then the mobile communication device 102 selects the service provider 104 to handle the communication session. If the rate quote 206 is greater than a lower one of the rate quotes 210 and 214, but within a pre-determined range of the lower one of the rate quotes 210 and 214, then the mobile communication device 102 selects the service provider 104 to handle the communication session. If the rate quote 206 is greater than the lower one of the rate quotes 210 and 214, and is above the pre-determined range of the lower one of the rate quotes 210 and 214, then the mobile communication device 102 selects the lower one of the service providers 106 and 108 to handle the communication session.

After selection of one of the service providers 104, 106 and 108 to handle the communication session, the mobile communication device 102 discontinues communication with other ones of the service providers 104, 106 and 108 and initiates call setup with the selected one of the service providers 104, 106 and 108 for the communication session. The mobile communication device 102 in one example determines that the rate quote 210 was the best rate quote of the rate quotes 206, 210, and 214. Since the service provider 106 sent the rate quote 210, the mobile communication device 102 selects the service provider 106 to handle the communication session. So, the mobile communication device 102 initiates call setup 216 with the service provider 106. Upon receipt of the call setup 216, the service provider 106 sends a channel assignment 218 to the mobile communication device 102. Upon receipt of the channel assignment 218, the mobile communication device 102 begins call connection 220 through the service provider 106. The service provider 106 connects the communication session to another communication device for the duration of the communication session.

Upon completion of the communication session, the service provider 106 that handled the communication session sends a billing report 222 for the communication session to the billing system component 110. The billing system component 110 compiles the billing report 222 with one or more other billing reports from one or more of the service providers 104, 106 and 108 for one or more other communication sessions billable to the mobile communication device 102.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the mobile communication device 102 and/or the service providers 104, 106 and 108. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
 a mobile communication device that sends a plurality of rate queries to a plurality of service providers for a communication session, and the mobile communication device communicates with each of the service providers;
 wherein the plurality of rate queries carry connection information of the communication session that indicates a) a location of endpoints of the communication session and b) a type of communication session; and
 wherein based on one or more rate quotes received from one or more of the plurality of service providers in response to one or more of the plurality of rate queries, the mobile communication device selects one of the plurality of service providers to handle a communication session; and
 wherein the mobile communication device selects a preferred service provider to handle the communication session when a higher rate quote of the preferred service provider is within a predetermined range of lower rate quotes of other of the plurality of service providers; and
 wherein, upon receipt of the one or more of the plurality of rate queries, the one or more of the plurality of service providers determine the one or more rate quotes as a function of a time of day, a current network load, an availability of excess capacity, and the location of the endpoints of the communication session.

2. The apparatus of claim 1, wherein the plurality of service providers comprise a first service provider and a second service provider, and wherein the plurality of rate queries comprises a first rate query and a second rate query, and wherein the one or more rate quotes comprise a first rate quote from the first service provider and a second rate quote from the second service provider; and
 wherein the mobile communication device sends the first rate query to the first service provider to request the first rate quote from the first service provider for the communication session; and
 wherein the mobile communication device sends the second rate query to the second service provider to request the second rate quote from the second service provider for the communication session.

3. The apparatus of claim 2, wherein if the first rate quote comprises a lowest per minute rate of the one or more rate quotes, then the mobile communication device selects the first service provider for connection of the communication session; and
 wherein if the second rate quote comprises the lowest per minute rate of the one or more rate quotes, then the mobile communication device selects the second service provider for connection of the communication session.

4. The apparatus of claim 2, wherein a user of the mobile communication device pre-sets the first service provider as the preferred service provider, and wherein one of the first rate quote and the second rate quote comprises a lowest per minute rate of the one or more rate quotes; and
 wherein if the first rate quote is less than or equal to the second rate quote, then the mobile communication device selects the first service provider to handle the communication session; arid
 wherein if the first rate quote is greater than the second rate quote but within a pre-determined range of the second rate quote, then the mobile communication device selects the first service provider to handle the communication session; and
 wherein if the first rate quote is greater than the second rate quote and is above the pre-determined range of the second rate quote, then the mobile communication device selects the second service provider to handle the communication session.

5. The apparatus of claim 1, wherein after selection of the one of the plurality of service providers to handle the communication session, the mobile communication device discontinues communication with other service providers of the plurality of service providers and initiates call setup with the one of the plurality of service providers for the communication session.

6. The apparatus of claim 1, wherein the mobile communication device comprises a plurality of service provider protocols and software to interface with the plurality of service providers.

7. The apparatus of claim 1, wherein the mobile communication device comprises a multi-mode mobile communication device that can support communication sessions within a plurality of different frequency bands.

8. The apparatus of claim 7, wherein the plurality of service providers comprise a first service provider that operates within a first frequency band of the plurality of different frequency bands and a second service provider that operates within a second frequency band of the plurality of different frequency bands, wherein the plurality of rate queries comprises a first rate query and a second rate query; and
 wherein the mobile communication device sets the first frequency band for active operation, and wherein the mobile communication device employs the first frequency band to send the first rate query to the first service provider; and wherein the mobile communication device switches from active operation of the first frequency band to active operation of the second frequency band, and wherein the mobile communication device employs the second frequency band to send the second rate query to the second service provider.

9. The apparatus of claim 8, wherein the one or more rate quotes comprise a first rate quote from the first service provider and a second rate quote from the second service provider; and
wherein the mobile communication device sets the first frequency band for active operation, and wherein the mobile communication device employs the first frequency band to receive the first rate quote from the first service provider; and
wherein the mobile communication device switches from active operation of the first frequency band to active operation of the second frequency band, and wherein the mobile communication device employs the second frequency band to receive the second rate quote from the second service provider.

10. The apparatus of claim 1, wherein the mobile communication device comprises a multi-mode mobile communication device that can support communication sessions with a plurality of different air interface technologies; and
wherein the plurality of service providers comprise a first service provider that employs a first air interface technology of the plurality of different air interface technologies and a second service provider that employs a second air interface technology of the plurality of different air interface technologies; and
wherein the plurality of rate queries comprises a first rate query and a second rate query, and wherein the one or more rate quotes comprise a first rate quote from the first service provider and a second rate quote from the second service provider; and
wherein the mobile communication device sets the first air interface technology for active operation, and wherein the mobile communication device employs the first air interface technology to send the first rate query to the first service provider to trigger the first rate quote from the first service provider; and
wherein the mobile communication device switches from active operation of the first air interface technology to active operation of the second air interface technology, and wherein the mobile communication device employs the second air interface technology to send the second rate query to the second service provider to trigger the second rate quote from the second service provider.

11. The apparatus of claim 1, wherein upon attempt by a user of the mobile communication device to initiate the communication session, the mobile communication device sends the plurality of rate queries to the plurality of service providers to determine a lowest rate available from the plurality of service providers for the communication session.

12. The apparatus of claim 1, wherein the plurality of service providers comprises a plurality of wireless service providers; and
wherein the mobile communication device sends the plurality of rate queries to trigger one or more of the plurality of wireless service providers to send the one or more rate quotes to the mobile communication device to indicate one or more per minute rates for the communication session.

13. The apparatus of claim 1, further comprising a billing system component;
wherein upon completion of the communication session, the one of the plurality of service providers that handles the communication session sends a billing report for the communication session to the billing system component; and
wherein the billing system component compiles the billing report with one or more other billing reports from one or more of the plurality of service providers for one or more other communication sessions billable to the mobile communication device.

14. The apparatus of claim 1, wherein the plurality of service providers sell the available excess capacity at a discounted rate.

15. The apparatus of claim 1, wherein the mobile communication device selects the preferred service provider to handle the communication session when the rate quote of the preferred service provider is equal to the one or more rate quotes of the other of the plurality of service providers.

16. The apparatus of claim 1, wherein a user of the mobile communication device pre-sets a service provider of the plurality of service providers as the preferred service provider.

17. The apparatus of claim 13, wherein the billing system component maintains Automatic Message Accounting (AMA) billing records.

18. The apparatus of claim 1, wherein the mobile communication device sends the plurality of rate queries to the plurality of service providers before connection of a call to another communication device.

19. A method, comprising the steps of:
sending, via a mobile communication device, a plurality of rate queries to a plurality of wireless service providers to trigger one or more rate quotes from one or more of the plurality of wireless service providers for a communication session, and the mobile communication device communicates with each of the wireless service providers;
selecting a preferred service provider to handle the communication session when a higher rate quote of the preferred service provides is within a pre-determined range of lower rate quotes of other of the plurality of wireless service providers; and
connecting the call through one of the plurality of wireless service providers based on the one or more rate quotes;
wherein the plurality of rate queries carry connection information of the communication session that indicates a) a location of endpoints of the communication session and b) a type of communication session; and
wherein, upon receipt of the plurality of rate queries, the plurality of wireless service providers determine the one or more rate quotes as a function of a time of day, a current network load, an availability of excess capacity, and the location of the endpoints of the communication session.

20. The method of claim 19, wherein the step of sending, via the mobile communication device, the plurality of rate queries to the plurality of wireless service providers to trigger the one or more rate quotes from the one or more of the plurality of wireless service providers further comprises the step of:
sending the plurality of rate queries to the plurality of service providers to determine a lowest rate available from the plurality of service providers for the communication session upon attempt by a user to initiate the communication session.

21. The method of claim 19, wherein the plurality of service providers comprise a first service provider and a second service provider, and wherein the plurality of rate queries comprises a first rate query and a second rate query, and wherein the one or more rate quotes comprise a first rate quote from the first service provider and a second rate quote from the second service provider; and wherein the step of sending, via the mobile communication device, the plurality of rate queries to the plurality of wireless service providers to trigger the one or more rate quotes from the one or more of the plurality of wireless service providers further comprises the steps of:

sending the first rate query to the first service provider to trigger the first rate quote from the first wireless service provider; and sending the second rate query to the second service provider to trigger the second rate quote from the second wireless service provider.

22. The method of claim 21, wherein the step of connecting the call through the one of the plurality of wireless service providers based on the one or more rate quotes further comprises the steps of:

selecting the first service provider for connection of the communication session if the first rate quote is the lowest per minute rate of the one or more rate quotes; and selecting the second service provider for connection of the communication session if the second rate quote is the lowest per minute rate of the one or more rate quotes.

23. The method of claim 21, further comprising the step of:

pre-setting the first service provider as the preferred service provider;

wherein one of the first rate quote and the second rate quote comprises a lowest per minute rate of the one or more rate quotes, and wherein the step of connecting the call through the one of the plurality of wireless service providers based on the one or more rate quotes further comprises the steps of:

selecting the first service provider to handle the communication session if the first rate quote is less than or equal to the second rate quote;

selecting the first service provider to handle the communication session if the first rate quote is greater than the second rate quote but within a pre-determined range of the second rate quote; and selecting the second service provider to handle the communication session if the first rate quote is greater than the second rate quote and is above the pre-determined range of the second rate quote.

24. The method of claim 21, wherein the first service provider operates within a first frequency band and the second service provider operates within a second frequency band; and wherein the step of sending the first rate query to the first service provider to trigger the first rate quote from the first wireless service provider further comprises the steps of:

setting the first frequency band for active operation;

employing the first frequency band to send the first rate query to the first service provider; and employing the first frequency band to receive the first rate quote from the first service provider; and wherein the step of sending the second rate query to the second service provider to trigger the second rate quote from the second wireless service provider further comprises the steps of:

switching from active operation of the first frequency band to active operation of the second frequency band;

employing the second frequency band to send the second rate query to the second service provider; and employing the second frequency band to receive the second rate quote from the second service provider.

\* \* \* \* \*